(12) United States Patent
Kashihara et al.

(10) Patent No.: US 7,291,954 B2
(45) Date of Patent: Nov. 6, 2007

(54) DYNAMOELECTRIC MACHINE

(75) Inventors: Toshiaki Kashihara, Tokyo (JP); Shogo Okamoto, Tokyo (JP); Hiroyuki Akita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 204 days.

(21) Appl. No.: 10/553,800

(22) PCT Filed: Apr. 28, 2004

(86) PCT No.: PCT/JP2004/006134

§ 371 (c)(1),
(2), (4) Date: Oct. 18, 2005

(87) PCT Pub. No.: WO2005/107040

PCT Pub. Date: Nov. 10, 2005

(65) Prior Publication Data

US 2006/0208594 A1    Sep. 21, 2006

(51) Int. Cl.
  H02K 3/04    (2006.01)
  H02K 3/06    (2006.01)
(52) U.S. Cl. ........................ 310/184; 310/180
(58) Field of Classification Search ........ 310/179–180, 310/184
See application file for complete search history.

(56) References Cited

U.S. PATENT DOCUMENTS 6,570,289 B1 *  5/2003  Liang et al. ................ 310/179
6,784,583 B2 *  8/2004  Umeda ....................... 310/179
7,075,206 B1 *  7/2006  Chen ......................... 310/179
2004/0061400 A1    4/2004  Fukushima et al.
2004/0150284 A1 *  8/2004  Umeda ....................... 310/179

FOREIGN PATENT DOCUMENTS

| JP | 50-139312 A | 11/1975 |
|---|---|---|
| JP | 54-39805 A | 3/1979 |
| JP | 3-183346 A | 9/1991 |
| JP | 5-308751 A | 11/1993 |
| JP | 6-284615 A | 10/1994 |
| JP | 11-164582 A | 6/1999 |
| JP | 3041884 B2 | 3/2000 |
| WO | WO 2005/107040 A1 | 11/2005 |

* cited by examiner

Primary Examiner—Burton Mullins
(74) Attorney, Agent, or Firm—Sughrue Mion Pllc.

(57) ABSTRACT

In a dynamoelectric machine according to the present invention, a first three-phase wye-delta hybrid winding and a second three-phase wye-delta hybrid winding are installed in a stator core having a plurality of slots. A first delta U winding portion and a first wye U winding portion are housed in identical slots, a first delta V winding portion and a first wye V winding portion are housed in identical slots, and a first delta W winding portion and a first wye W winding portion are housed in identical slots. A second delta U winding portion and a second wye U winding portion are housed in identical slots, a second delta V winding portion and a second wye V winding portion are housed in identical slots, and a second delta W winding portion and a second wye W winding portion are housed in identical slots.

16 Claims, 8 Drawing Sheets

DYNAMOELECTRIC MACHINE

TECHNICAL FIELD

The present invention relates to a dynamoelectric machine driven by an internal combustion engine, for example, and mountable to a passenger car, a truck, etc.

BACKGROUND ART

In recent years, improvements in power output have been sought in automotive alternators due to increases in vehicle loads, and examples of configurations aiming to achieve such improvements in power output include Japanese Patent Laid-Open No. HEI 5-308751 (Gazette), for example, which discloses an automotive alternator including two independent three-phase stator windings.

However, in such configurations, because two stators are disposed axially on a shaft, one problem has been that axial dimensions are increased, increasing overall size.

DISCLOSURE OF INVENTION

The present invention aims to solve the above problems and an object of the present invention is to provide a dynamoelectric machine enabling reductions in size to be achieved while ensuring high output.

In order to achieve the above object, according to one aspect of the present invention, there is provided a dynamoelectric machine including: a stator core having a plurality of slots extending axially; and a first three-phase wye-delta hybrid winding and a second three-phase wye-delta hybrid winding installed in the slots, the first three-phase wye-delta hybrid winding having: a first delta-connected portion in which a first delta U winding portion, a first delta V winding portion, and a first delta W winding portion are each connected in a delta shape; and a second wye U winding portion, a second wye V winding portion, and a second wye W winding portion each connected to the first delta-connected portion in a Y (wye) shape, the second three-phase wye-delta hybrid winding having: a second delta-connected portion in which a second delta U winding portion, a second delta V winding portion, and a second delta W winding portion are each connected in a delta shape; and a first wye U winding portion, a first wye V winding portion, and a first wye W winding portion each connected to the second delta-connected portion in a Y (wye) shape, the first delta U winding portion and the first wye U winding portion being housed in identical slots, the first delta V winding portion and the first wye V winding portion being housed in identical slots, the first delta W winding portion and the first wye W winding portion being housed in identical slots, the second delta U winding portion and the second wye U winding portion being housed in identical slots, the second delta V winding portion and the second wye V winding portion being housed in identical slots, and the second delta W winding portion and the second wye W winding portion being housed in identical slots.

BEST MODE FOR CARRYING OUT THE INVENTION

Preferred embodiments of the present invention will now be explained with reference to the drawings, and members and portions identical or equivalent in each of the embodiments will be given identical numbering.

Embodiment 1

Figure 1:
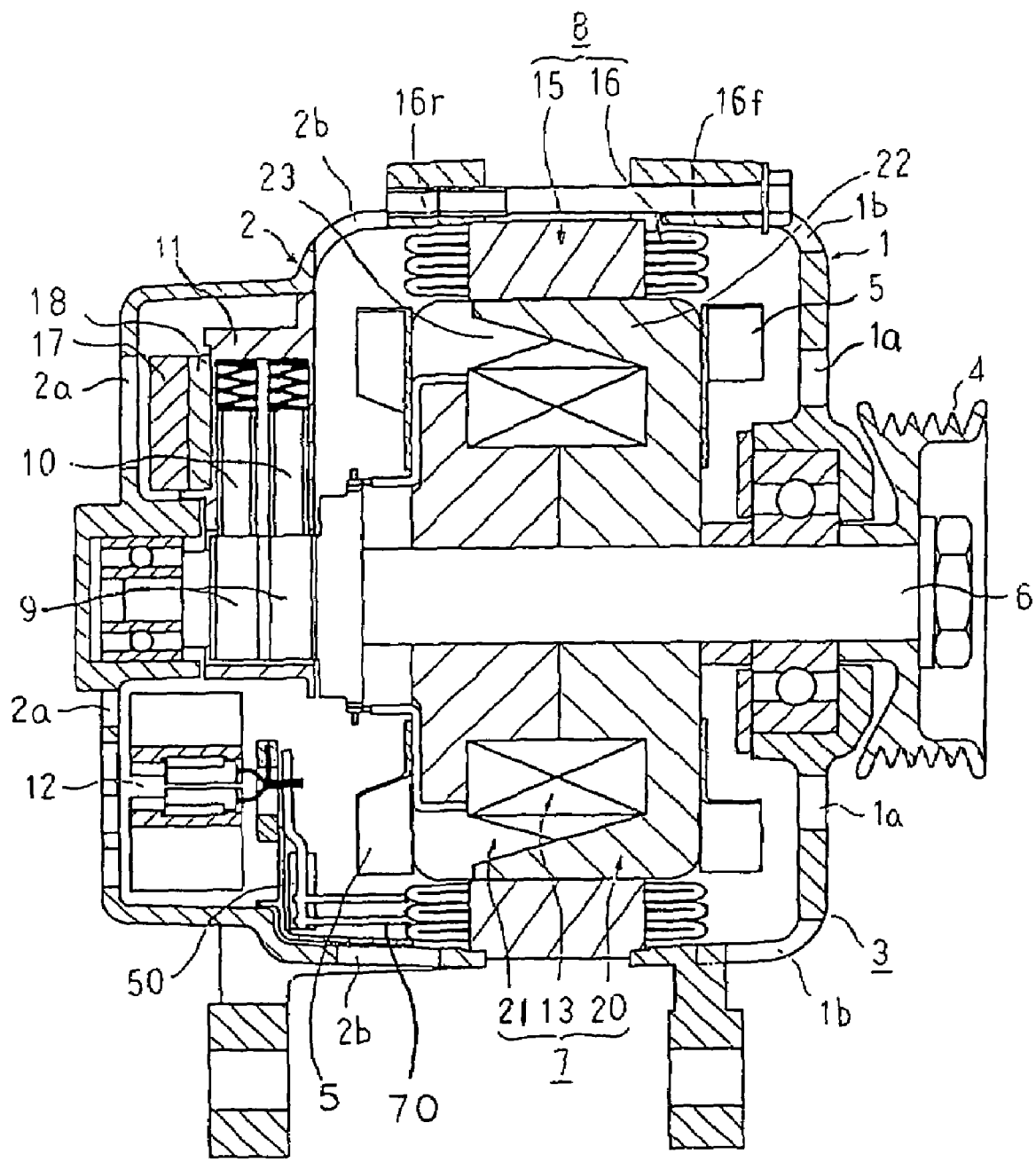
FIG. 1 is a cross section showing a configuration of an automotive alternator according to Embodiment 1 of the present invention.
Figure 2:
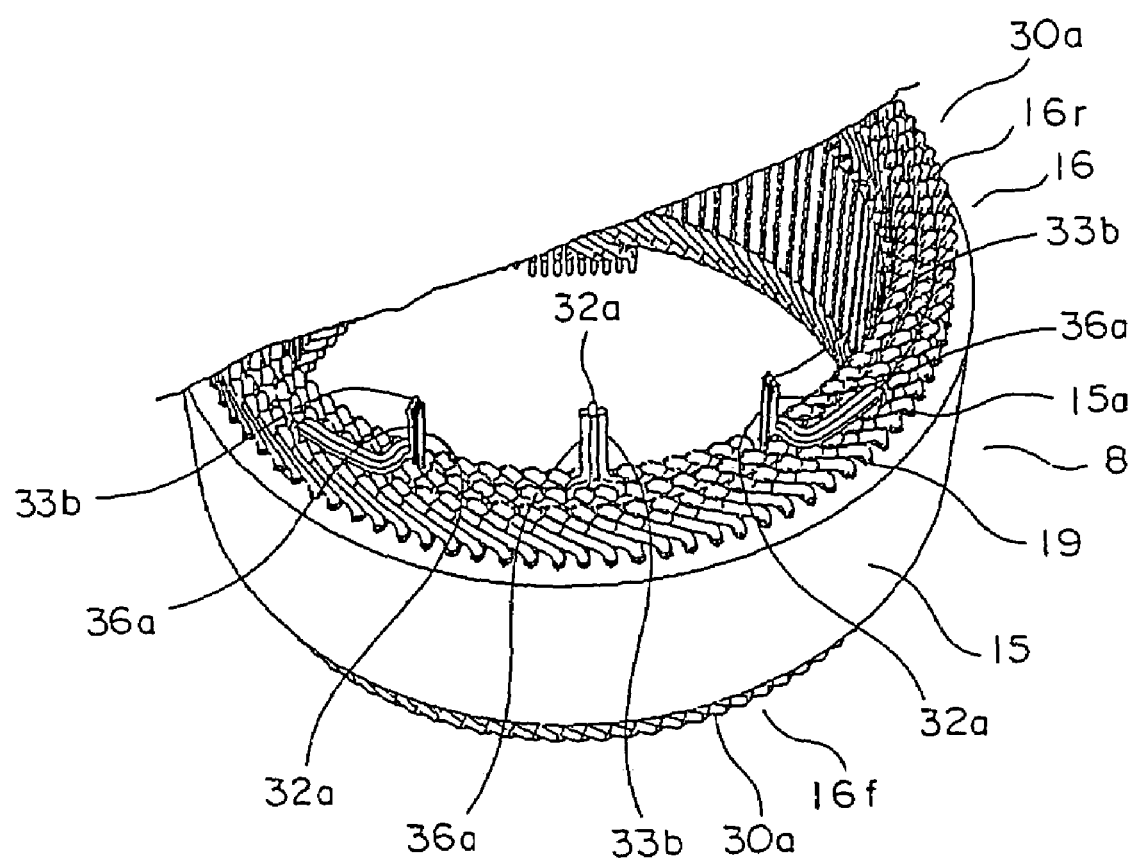
FIG. 2 is a partially cut-away perspective showing a stator of the automotive alternator in FIG. 1.
Figure 3:
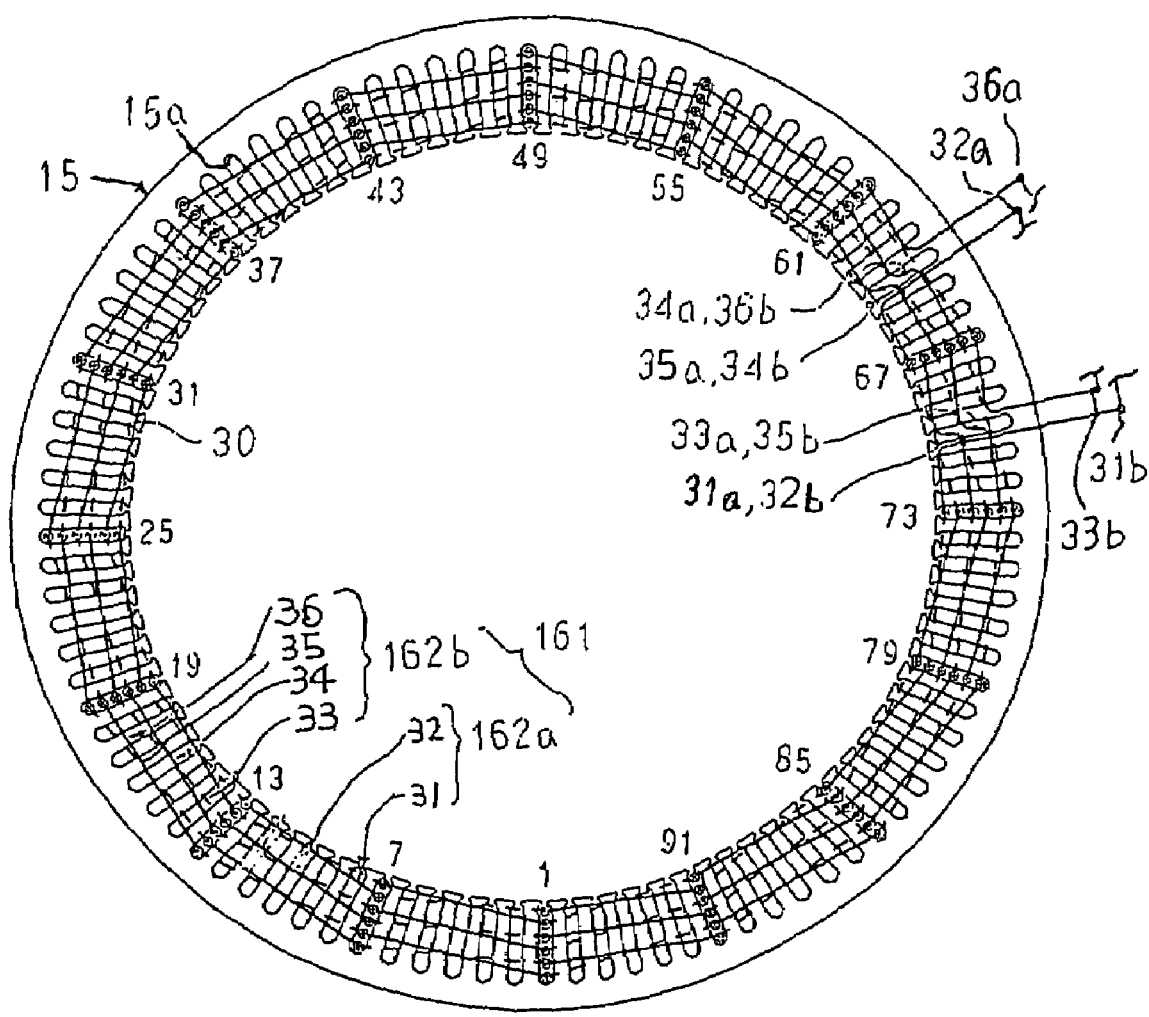
FIG. 3 is a connection diagram showing connections of a single phase of a stator winding in the automotive alternator in FIG. 1.

FIG. 1 is a cross section showing a configuration of an automotive alternator according to Embodiment 1 of the present invention, FIG. 2 is a partial perspective showing a stator from FIG. 1, and FIG. 3 is a connection diagram showing connections of a single phase of a stator winding 16 from FIG. 1.

In this automotive alternator, a Lundell-type rotor 7 functioning as a field is rotatably disposed by means of a shaft 6 inside a case 3 constituted by a front bracket 1 and a rear bracket 2 made of aluminum. A stator 8 functioning as an armature is disposed so as to be fixed to an inner wall surface of the case 3 around an outer periphery of the rotor 7. The shaft 6 is rotatably supported by the front bracket 1 and the rear bracket 2. A pulley 4 is affixed to a first end portion of the shaft 6 such that rotational torque from an engine can be transmitted to the shaft 6 by means of a belt (not shown). Slip rings 9 for supplying an electric current to the rotor 7 are affixed to a second end portion of the shaft 6. A pair of brushes 10 housed inside a brush holder 11 slide in contact with the slip rings 9.

A heat sink 17 is fitted onto the brush holder 11. A regulator 18 for adjusting magnitude of an alternating voltage generated in the stator 8 is affixed to the heat sink 17 using an adhesive. First and second rectifiers 12 electrically connected to the stator 8 so as to convert an alternating current generated in the stator 8 into a direct current are disposed inside the case 3.

The rotor 7 is constituted by: a rotor coil 13 for generating magnetic flux on passage of an electric current; and first and second pole cores 20 and 21 disposed so as to cover the rotor coil 13, magnetic poles being formed in the first and second pole cores 20 and 21 by the magnetic flux generated by the rotor coil 13. The first and second pole cores 20 and 21 are made of iron, each having eight first and second claw-shaped magnetic poles 22 and 23, respectively, disposed on an outer peripheral edge at a uniform angular pitch in a circumferential direction so as to project axially, and the first and second pole cores 20 and 21 are fixed to the shaft 6 facing each other such that the first and second claw-shaped magnetic poles 22 and 23 intermesh.

Fans 5 are affixed to first and second axial end surfaces of the rotor 7. Front-end and rear-end air intake apertures 1a and 2a are formed on first and second end surfaces of the front bracket 1 and the rear bracket 2. Front-end and rear-end air discharge apertures 1b and 2b are formed on first and second shoulder portions of the front bracket 1 and the rear bracket 2.

The stator 8 includes: a stator core 15 constituted by a cylindrical laminated core in which a plurality of slots 15a extending axially are formed at a predetermined pitch circumferentially; a stator winding 16 installed in the stator core 15; and insulators 19 mounted inside each of the slots 15a so as to insulate electrically between the stator winding 16 and the stator core 15.

Figure 4:
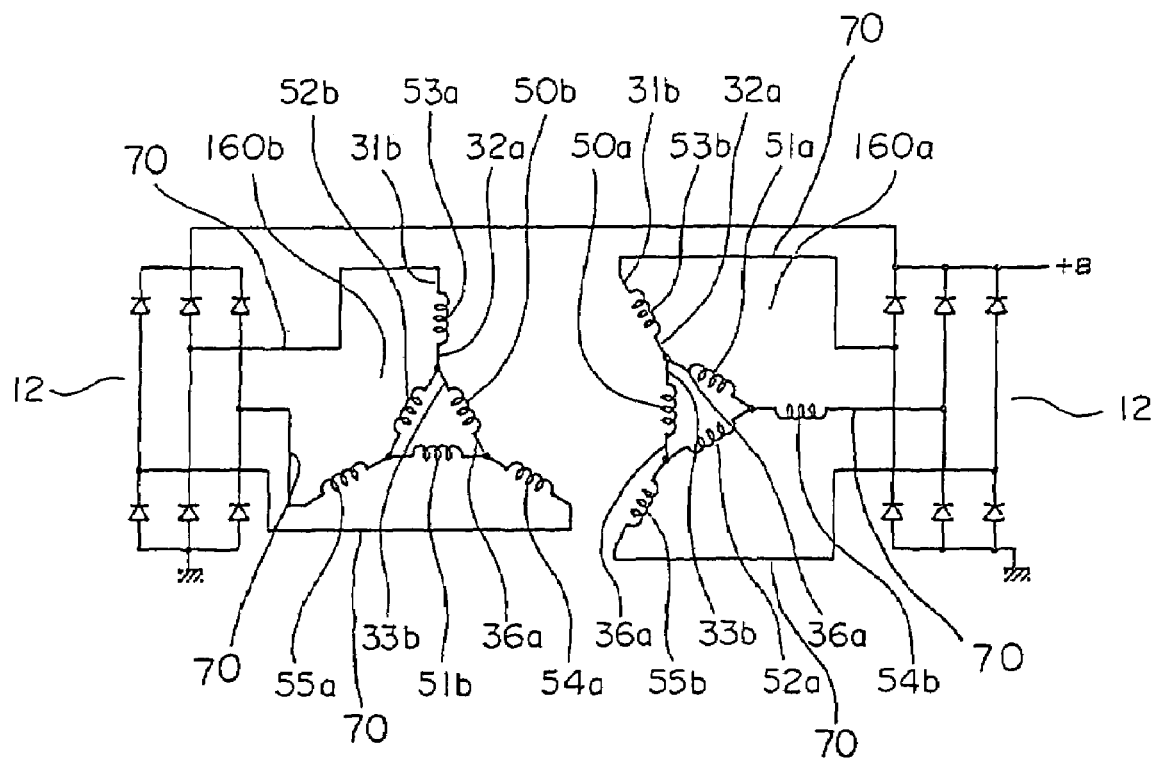
FIG. 4 is an electrical circuit diagram for the automotive alternator in FIG. 1.

The stator winding 16 is constituted by a first three-phase wye-delta hybrid winding 160a and a second three-phase wye-delta hybrid winding 160b, as can be seen from an electrical circuit diagram shown in FIG. 4.

The first three-phase wye-delta hybrid winding 160a and the second three-phase wye-delta hybrid winding 160b are installed in the slots 15a of the stator core 15 so as to have a phase difference corresponding to an electrical angle of approximately 30 degrees.

A stator winding phase portion 161 constituted by the first three-phase wye-delta hybrid winding 160a and the second three-phase wye-delta hybrid winding 160b is constituted by first through sixth winding sub-portions 31 through 36 each constituted by one continuous wire 30, as can be seen from the connection diagram shown in FIG. 3.

The first winding sub-portion 31 is configured into a single-turn full-pitch wave winding by winding a continuous wire 30 constituting a conductor into a full-pitch wave winding so as to alternately occupy a first position from an inner periphery (hereinafter called "Address 1") and a second position from the inner periphery (hereinafter called "Address 2") inside the slots 15a in every sixth slot in Slot Numbers 1 through 91, and joining together end portions of the continuous wire 30.

The second winding sub-portion 32 is configured into a single-turn full-pitch wave winding by winding a continuous wire 30 into a full-pitch wave winding so as to alternately occupy Address 2 and Address 1 inside the slots 15a in every sixth slot in Slot Numbers 1 through 91, and joining together end portions of the continuous wire 30.

The third winding sub-portion 33 is configured into a single-turn full-pitch wave winding by winding a continuous wire 30 into a full-pitch wave winding so as to alternately occupy a third position from the inner periphery (hereinafter called "Address 3") and a fourth position from the inner periphery (hereinafter called "Address 4") inside the slots 15a in every sixth slot in Slot Numbers 1 through 91, and joining together end portions of the continuous wire 30.

The fourth winding sub-portion 34 is configured into a single-turn full-pitch wave winding by winding a continuous wire 30 into a full-pitch wave winding so as to alternately occupy Address 4 and Address 3 inside the slots 15a in every sixth slot in Slot Numbers 1 through 91, and joining together end portions of the continuous wire 30. The fifth winding sub-portion 35 is configured into a single-turn full-pitch wave winding by winding a continuous wire 30 into a full-pitch wave winding so as to alternately occupy a fifth position from the inner periphery (hereinafter called "Address 5") and a sixth position from the inner periphery (hereinafter called "Address 6") inside the slots 15a in every sixth slot in Slot Numbers 1 through 91, and joining together end portions of the continuous wire 30.

The sixth winding sub-portion 36 is configured into a single-turn full-pitch wave winding by winding a continuous wire 30 into a full-pitch wave winding so as to alternately occupy Address 6 and Address 5 inside the slots 15a in every sixth slot in Slot Numbers 1 through 91, and joining together end portions of the continuous wire 30.

In each of the slots 15a, six conductor wires 30 are arranged so as to line up in one column radially with longitudinal axes of rectangular cross sections aligned radially.

Thus, each of the continuous wire 30 constituting the first through sixth winding sub-portions 31 through 36 is installed in a full-pitch wave winding so as to project outward from one slot 2a at an end surface of the stator core 2, turn around, and enter a slot 15a six slots away, and is installed so as to alternately occupy an inner layer and an outer layer in a slot depth direction (radially) inside the slots 15a in every sixth slot.

Return portions 30a of the continuous wires 30 projecting outward and turning around at the end surfaces of the stator core 15 form coil end portions. The return portions 30a, which are formed so as to have a generally uniform shape, are separated from each other circumferentially and radially, and arranged circumferentially in three neat layers, forming front-end and rear-end coil ends 16f and 16r at first and second ends of the stator core 15.

In this embodiment, portions of the continuous wires 30 of the second, fourth, and sixth winding sub-portions 32, 34, and 36 projecting outward from Slot Numbers 61 and 67 at the first end of the stator core 15 are cut, portions of the continuous wires 30 of the first, third, and fifth winding sub-portions 31, 33, and 35 projecting outward at the first end of the stator core 15 from Slot Numbers 67 and 73 are cut, and a first cut end portion 31a of the first winding sub-portion 31 and a second cut end portion 32b of the second winding sub-portion 32 are joined together to form a two-turn first series-connected winding portion 162a in which the first and second winding sub-portions 31 and 32 are connected in series. A second cut end portion 31b at an opposite end of the first winding sub-portion 31 from the first cut end portion 31a and a first cut end portion 32a at an opposite end of the second winding sub-portion 32 from the second cut end portion 32b project axially outward from the stator core 15.

Similarly, a first cut end portion 33a of the third winding sub-portion 33 and a second cut end portion 35b of the fifth winding sub-portion 35 are joined together, a first cut end portion 34a of the fourth winding sub-portion 34 and a second cut end portion 36b of the sixth winding phase sub-portion 36 are joined together, and a first cut end portion 35a of the fifth winding sub-portion 35 and a second cut end portion 34b of the fourth winding sub-portion 34 are joined together to form a four-turn second series-connected winding portion 162b in which the third, fourth, fifth, and sixth winding sub-portions 33, 34, 35, and 36 are connected in series. A second cut end portion 33b at an opposite end of the third winding sub-portion 33 from the first cut end portion 33a and a first cut end portion 36a at an opposite end of the sixth winding sub-portion 36 from the second cut end portion 36b project axially outward from the stator core 15.

A single phase portion of the stator winding 16 is formed in this manner, and another five phase portions are also formed similarly while offsetting the slots 15a into which the continuous wires 30 are installed by one slot each.

The four-turn second series-connected winding portions 162b each constitute a first delta U winding portion 50a, a second delta U winding portion 50b, a first delta V winding portion 51a, a second delta V winding portion 51b, a first delta W winding portion 52a, and a second delta W winding portion 52b, respectively, as shown in FIG. 4.

The two-turn first series-connected winding portions 162a each constitute a first wye U winding portion 53a, a second wye U winding portion 53b, a first wye V winding portion 54a, a second wye V winding portion 54b, a first wye W winding portion 55a, and a second wye W winding portion 55b, respectively.

In the first three-phase wye delta hybrid winding 160a, the first delta U winding portion 50a, the first delta V winding portion 51a, and the first delta W winding portion 52a are all connected in a delta shape to constitute a first delta-connected portion, and the second wye U winding portion 53b, the second wye V winding portion 54b, and the second wye W winding portion 55b are each connected to the first delta-connected portion in a Y (wye) shape. Second end portions of the second wye U winding portion 53b, the second wye V winding portion 54b, and the second wye W winding portion 55b are each connected to the first rectifier 12 by means of output wires 70 having a circular cross sectional shape.

In the second three-phase wye delta hybrid winding 160b, the second delta U winding portion 50b, the second delta V winding portion 51b and the second delta W winding portion 52b are all connected in a delta shape to constitute a second delta connected portion, and the first wye U winding portion 53a, the first wye V winding portion 54a, and the first wye W winding portion 55a are each connected to the second delta connected portion in a Y (wye) shape. Second end portions of the first wye U winding portion 53a, the first wye V winding portion 54a, and the first wye W winding portion 55a are each connected to the second rectifier 12 by means of output wires 70.

Figure 5:
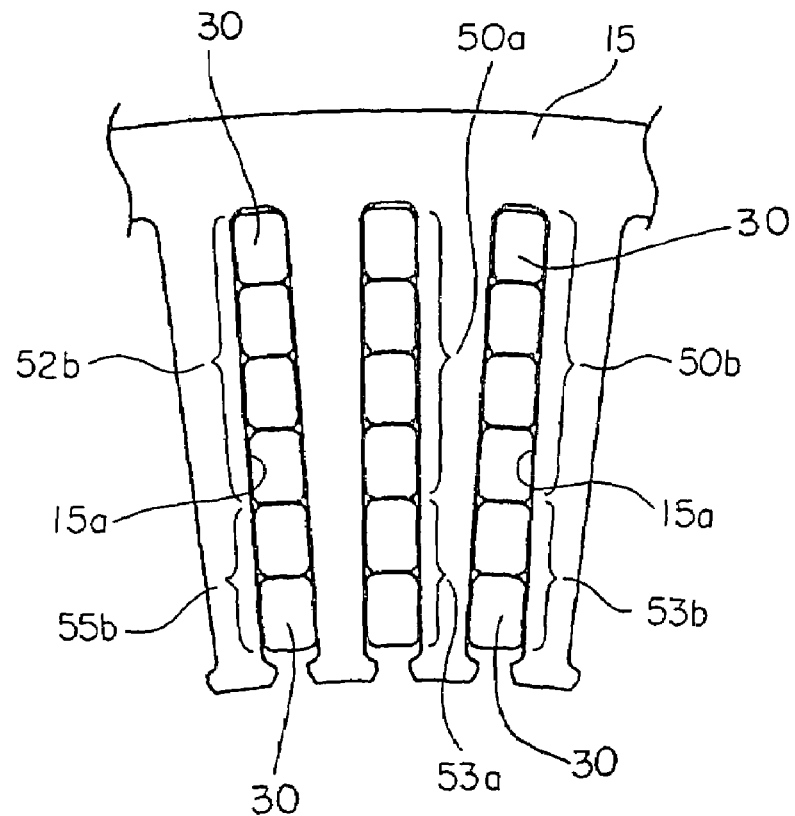
FIG. 5 is a cross section showing an arrangement of conductors inside slots in a stator core from FIG. 1.

The first delta U winding portion 50a and the first wye U winding portion 53a are housed in identical slots 15a to each other (first set of slots 15a), as shown in FIG. 5. The second delta-U winding portion 50b and the second wye U winding portion 53b are housed in identical slots 15a to each other in a second set of slots 15a to the right of the first set of slots 15a.

In FIG. 5, although not shown, the first delta V winding portion 51a and the first wye V winding portion 54a, the second delta V winding portion 51b and the second wye V winding portion 54b, the first delta W winding portion 52a and the first wye W winding portion, and the second delta W winding portion 52b and the second wye W winding portion 55b are also housed sequentially in third through sixth sets of slots 15a in a clockwise direction.

Thus, the winding portions of identical phases of the first three-phase wye-delta hybrid winding 160a and the second three-phase wye-delta hybrid winding 160b are housed sequentially in order of a U phase, a V phase, and a W phase in each of the sets of slots 15a in a clockwise direction.

Inside each of the slots 15a, the wye-connected conductors constituting the first wye U winding portion 53a, the second wye U winding portion 53b, the first wye V winding portion 54a, the second wye V winding portion 54b, the first wye W winding portion 55a, and the second wye W winding portion 55b, respectively, are disposed radially further inward than the delta-connected conductors constituting the first delta U winding portion 50a, the second delta-U winding portion 50b, the first delta V winding portion 51a, the second delta V winding portion 51b, the first delta W winding portion 52a, and the second delta W winding portion 52b, respectively, as shown in FIG. 5.

The output wires 70 connected to the rectifiers 12 project outward from the innermost layer inside the slots 15a.

In an automotive alternator configured in this manner, an electric current is supplied to the rotor coil 13 from a battery (not shown) by means of the brushes 10 and the slip rings 9, generating a magnetic flux. The first claw-shaped magnetic poles 22 in the first pole core 20 are magnetized into North-seeking (N) poles by this magnetic flux, and the second claw-shaped magnetic poles 23 in the second pole core 21 are magnetized into South-seeking (S) poles. At the same time, the rotational torque from the engine is transmitted to the shaft 6 by means of the belt (not shown) and the pulley 4, rotating the rotor 7. Thus, a rotating magnetic field is imparted to the stator winding 16, generating an electromotive force in the stator winding 16. This alternating-current electromotive force passes through the rectifiers 12 so as to be converted into a direct current, the current is combined, and then the magnitude thereof is adjusted by the regulator 18 and charged to the battery.

Due to rotation of the fans 5 secured to the first and second axial end surfaces of the rotor 7, at a rear bracket 2 end, external air is drawn in through the rear-end air intake apertures 2a, cooling the rectifiers 12 and the regulator 18, is then deflected centrifugally by the fans 5, cooling the rear-end coil ends 16r of the stator winding 16, and is discharged externally through the rear-end air discharge apertures 2b.

At a front bracket 1 end, external air is drawn in through the front-end air intake apertures 1a, is then deflected centrifugally by the fans 5, cooling the front-end coil ends 16f of the stator winding 16, and is discharged externally through front-end air discharge apertures 1b.

In an automotive alternator according to this embodiment, the first three-phase wye-delta hybrid winding 160a and the second three-phase wye-delta hybrid winding 160b are installed in a single stator core 15, enabling axial dimensions to be shortened unlike conventional configurations having a plurality of stators, and the automotive alternator can be reduced in size. Operations required conventionally for wiring between stators are also no longer necessary, enabling wiring operations to be performed simply on top of the coil ends 16r of the stator winding 16.

The first three-phase wye-delta hybrid winding 160a and the second three-phase wye-delta hybrid winding 160b are disposed so as to have a phase difference corresponding to an electrical angle of approximately 30 degrees, canceling out fifth and seventh harmonic components of magnetic vibrational force and reducing electromagnetic noise.

Because the stator winding phase portions 161 are constituted by full-pitch windings, the fifth and seventh harmonic components of magnetic vibrational force are canceled out completely, reducing electromagnetic noise.

Moreover, similar effects are also exhibited if all of the winding portions are constituted by short-pitch windings and configured such that conductors in all of the slots are equal in number.

Because the alternating-current outputs from the first three-phase wye-delta hybrid winding 160a and the second three-phase wye-delta hybrid winding 160b are independently rectified by the first and second rectifiers 12, respectively, then combined and outputted, high-output electric power can be achieved.

The fifth and seventh harmonic components of magnetic vibrational force are canceled out completely if a turn ratio between the wye-connected conductors and the delta-connected conductors is $1:\sqrt{3}$, but since it is difficult to set the turn ratio exactly to $1:\sqrt{3}$, the wye-connected first series-connected winding portions 162a are set to two turns, and the delta-connected second series-connected winding portions 162b to four turns.

In this embodiment, by setting the turn ratio to an integer ratio close to $1:\sqrt{3}$, that is, 1:2, even if the first three-phase wye-delta hybrid winding 160a breaks down, electromagnetic noise is kept low and passengers will not experience any great discomfort because the fifth and seventh harmonic components of magnetic vibrational force are still canceled out by operation of the second three-phase wye-delta hybrid winding 160b.

Since the winding sub-portions 31 through 36 are configured by installing continuous wires 30 in wave windings in every sixth slot so as to alternately occupy inner layers and outer layers in a slot depth direction (radially) inside the slots 15a and the continuous wires 30 are separated into delta-connected conductors and wye-connected conductors having an even number of turns in each of the winding sub-portions 31 through 36, windability is good.

Since the continuous wires 30 are disposed inside the slots 15a with longitudinal directions of rectangular cross sections aligned radially, space factor is high, improving output efficiency of the automotive alternator.

Because the winding portions 53a, 53b, 54a, 54b, 55a, and 55b of the wye-connected portions, in which the electric current density is high, are disposed radially inside the stator core 15 and are near the fans 5, the winding portions 53a, 53b, 54a, 54b, 55a, and 55b of the wye-connected portions having a high current density are cooled efficiently, preventing temperature distribution in the stator winding 16 from becoming nonuniform.

Because the output wires 70 connected to the rectifiers 12 project outward from the innermost layer inside the slots 15a, sufficient distance can be ensured between the output wires 70 and the rear bracket 2 to prevent current leakage between the output wires 70 constituting alternating-current output terminals and the rear bracket 2 constituting grounding, enabling rusting or electrolytic corrosion to be prevented.

Moreover, because the stator core 15 fits together with an inner peripheral side of a front bracket 1 and a rear bracket 2 made of aluminum, conductors of the wye-connected portions, which have a higher current density, may also be disposed on a radially-outer side and be housed inside the slots such that three sides of the rectangular conductors disposed radially outermost are placed almost without clearance in close contact with inner wall surfaces of the slots 15a with insulators 19 interposed.

In that case, heat generated in the wye-connected conductors is discharged externally through the stator core and the brackets, efficiently cooling the wye-connected conductors.

Conductor cooling effects may also be further improved by forming radiating fins on outer peripheral surfaces of the bracket in the vicinity of the stator core.

Embodiment 2

Figure 6:
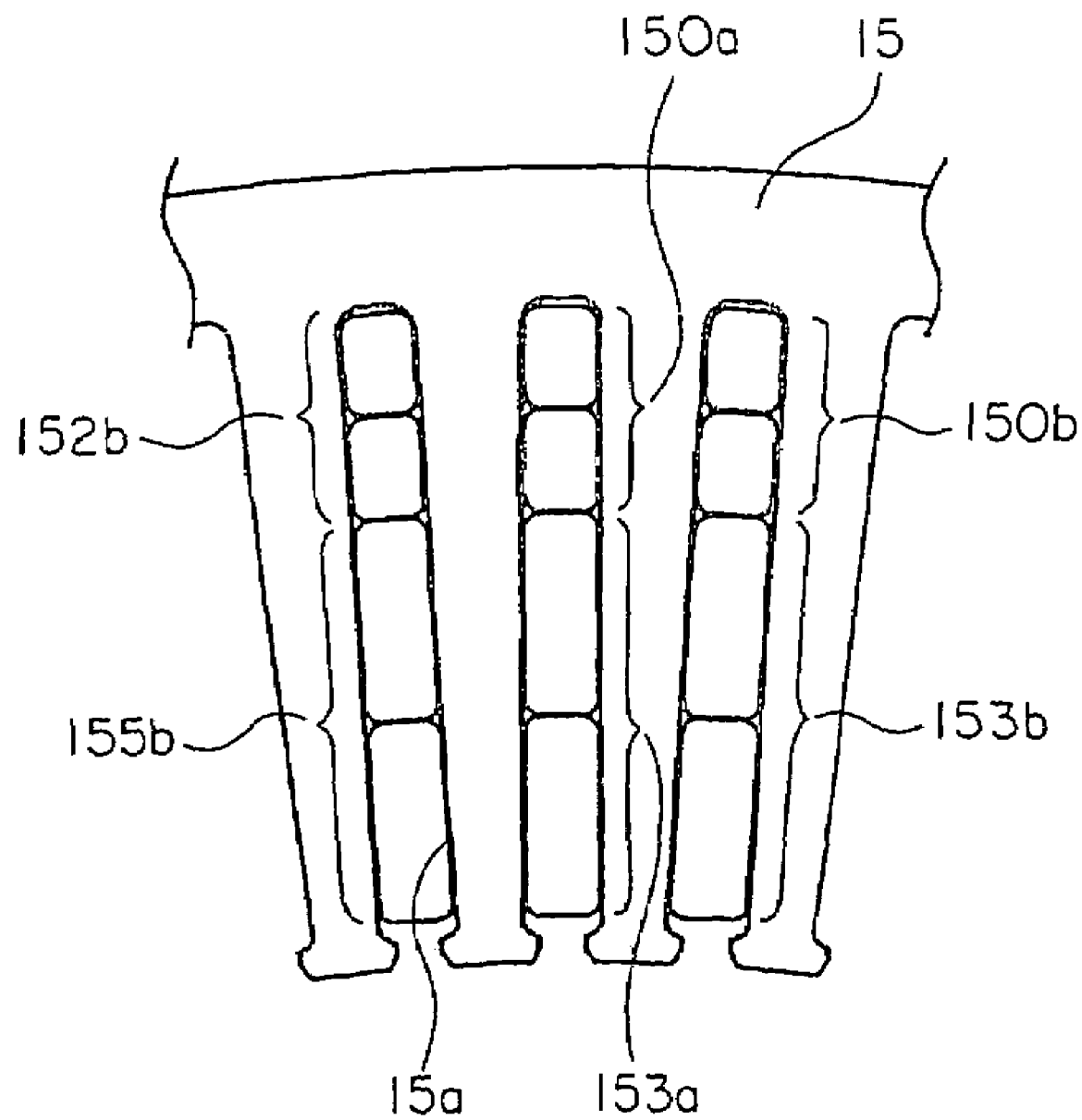
FIG. 6 is a cross section showing an arrangement of conductors inside slots in a stator core of an automotive alternator according to Embodiment 2 of the present invention.

FIG. 6 is a partial cross section of an automotive alternator according to Embodiment 2 of the present invention.

In an automotive alternator according to Embodiment 2, a first delta U winding portion 150a, a second delta U winding portion 150b, a first delta V winding portion, a second delta V winding portion, a first delta W winding portion, and a second delta W winding portion are constituted by two turns of first continuous wires constituting delta-connected conductors, and a first wye U winding portion 153a, a second wye U winding portion 153b, a first wye V winding portion, a second wye V winding portion, a first wye W winding portion, and a second wye W winding portion 155b are constituted by two turns of second continuous wires constituting wye-connected conductors made of a conductor having a different cross-sectional area to that of the first continuous wires.

The cross-sectional area of the conductors of the second continuous wires is configured so as to be greater than the cross-sectional area of the conductors of the first continuous wires by a factor of approximately $\sqrt{3}$.

In an automotive alternator according to Embodiment 2, the electric current density arising in the winding portions 150a, 150b, and 152b in the delta-connected portions and the electric current density arising in the winding portions 153a, 153b, and 155b in the wye-connected portions are generally equal, making temperature distribution in the stator winding 16 generally uniform.

Figure 7:
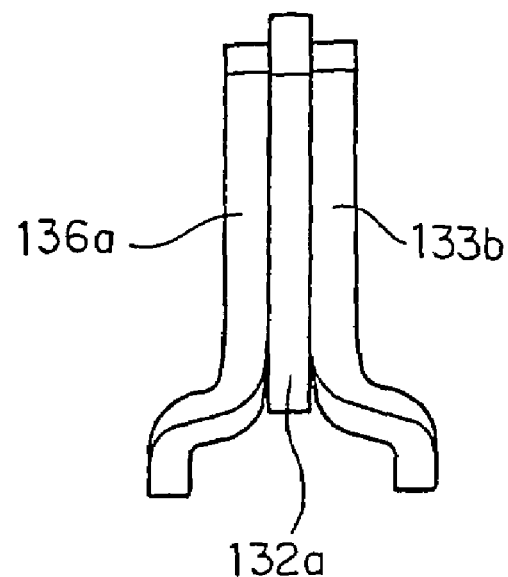
FIG. 7 is a perspective showing joining between an end portion of a wye-connected conductor and end portions of delta-connected conductors from FIG. 6.

First wye end portions 132a of each of the second wye U winding portion 153b, the second wye V winding portion, and the second wye W winding portion 155b connected in a Y (wye) shape to respective delta-connected portions project outward in straight lines axially from the stator core 15, and first and second surfaces of the first wye end portions 132a are joined together by surface contact with first and second delta end portions 133b and 136a of the first delta U winding portion 150b, the first delta V winding portion, and the first delta W winding portion, respectively, as shown in FIG. 7.

Figure 8:
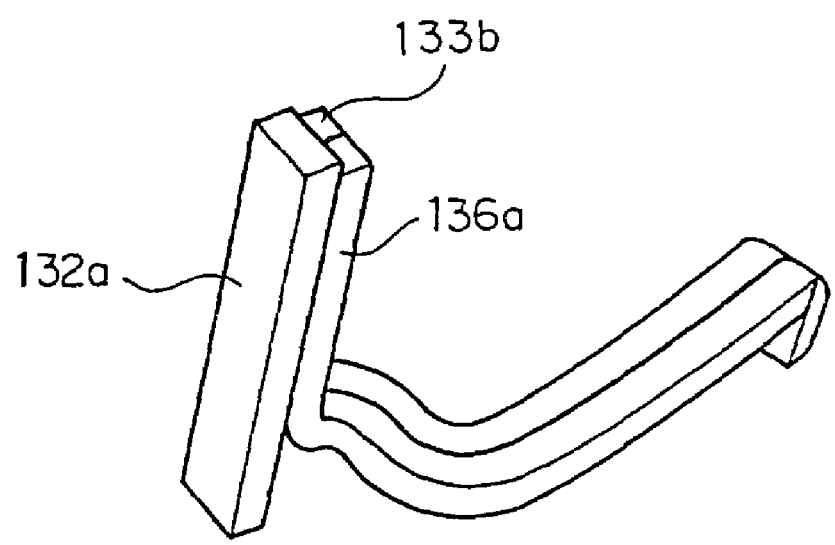
FIG. 8 is a perspective showing joining between an end portion of a wye-connected conductor and end portions of delta-connected conductors at a different position than that shown in FIG. 7.

At other positions connected to the delta-connected portions in a Y (wye) shape, the first and second delta end portions 133b and 136a are joined together by surface contact with a first or second surface of the first wye end portions 132a, as shown in FIG. 8.

Moreover, each of the end portions 132a, 133b and 136a, which are made of an oxygen-free copper, may also be joined together using TIG (tungsten inert gas) welding with flat surfaces in contact with each other.

Because the first wye and first and second delta end portions 132a, 133b, and 136a are joined together with each other by fusion welding using surface contact in this manner, and the contact surface area is large, heat generation in the first wye and first and second delta end portions 132a, 133b, and 136a can be suppressed.

Since the first wye end portions 132a of each of the second wye U winding portion 153b, the second wye V winding portion, and the second wye W winding portion 155b project outward from the rear-end coil ends 16r axially, the first wye end portions 132a will not be damaged by peeling of coatings.

The first wye end portions 132a are reinforced by the first and second delta end portions 133b and 136a, and the first wye and first and second delta end portions 132a, 133b, and 136a are joined firmly to each other.

Figure 9:
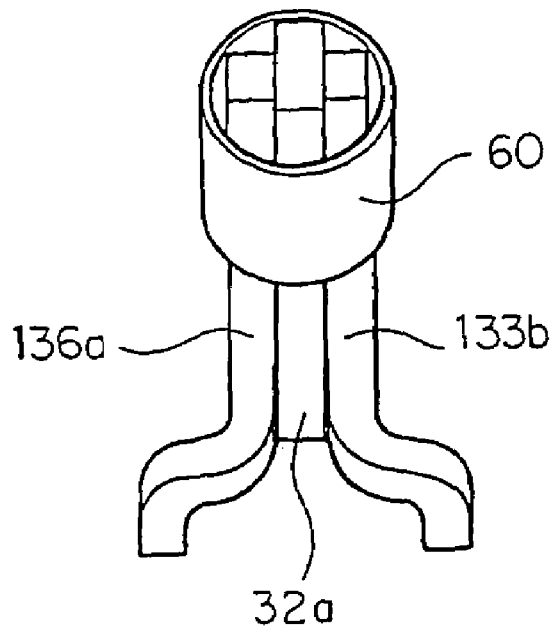
FIG. 9 is a perspective showing joining different than that shown in FIG. 7.
Figure 10:
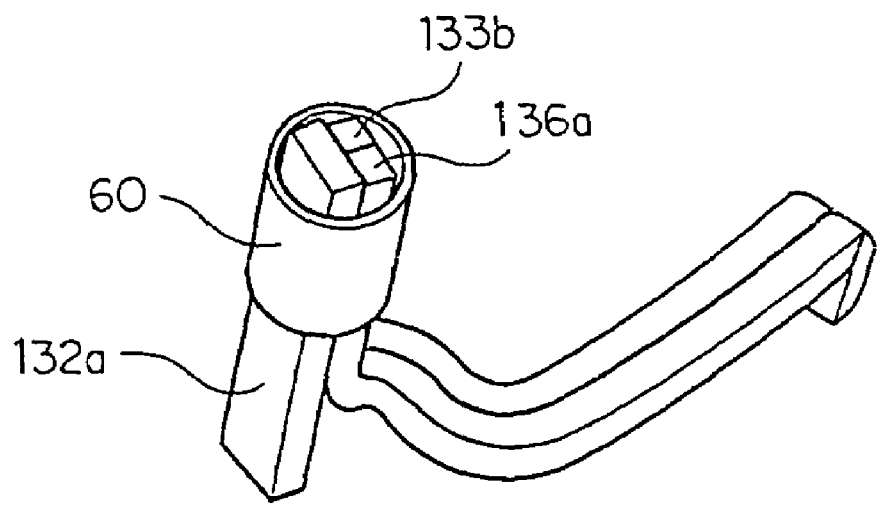
FIG. 10 is a perspective showing joining different than that shown in FIG. 8.

Moreover, as shown in FIGS. 9 and 10, a first wye end portion 132a, a second delta end portion 133b, and a first delta end portion 136a may also be joined together firmly to each other by surrounding and pressure welding them using a belt-shaped ring 60 made of a carbon steel sheet to which a thin film of tin is bonded.

Moreover, the second delta end portions 133b and the first delta end portions 136a, which have a quadrilateral cross sectional shape, may also be given a circular cross sectional shape. In that case, bending deformation of the second delta end portions 133b and the first delta end portions 136a having a circular cross sectional shape becomes possible in any direction, improving wiring connection freedom proportionately.

In FIGS. 7 through 10, joining between the delta-connected portions and the first wye end portions 132a of the second wye U winding portion 153b, the second wye V winding portion, and the second wye W winding portion 155b, respectively, has been explained, but the delta-connected portions and the first wye end portions of the first wye U winding portion, the first wye V winding portion, and the first wye W winding portion, respectively, are also joined together in a similar manner.

Embodiment 3

Figure 11:
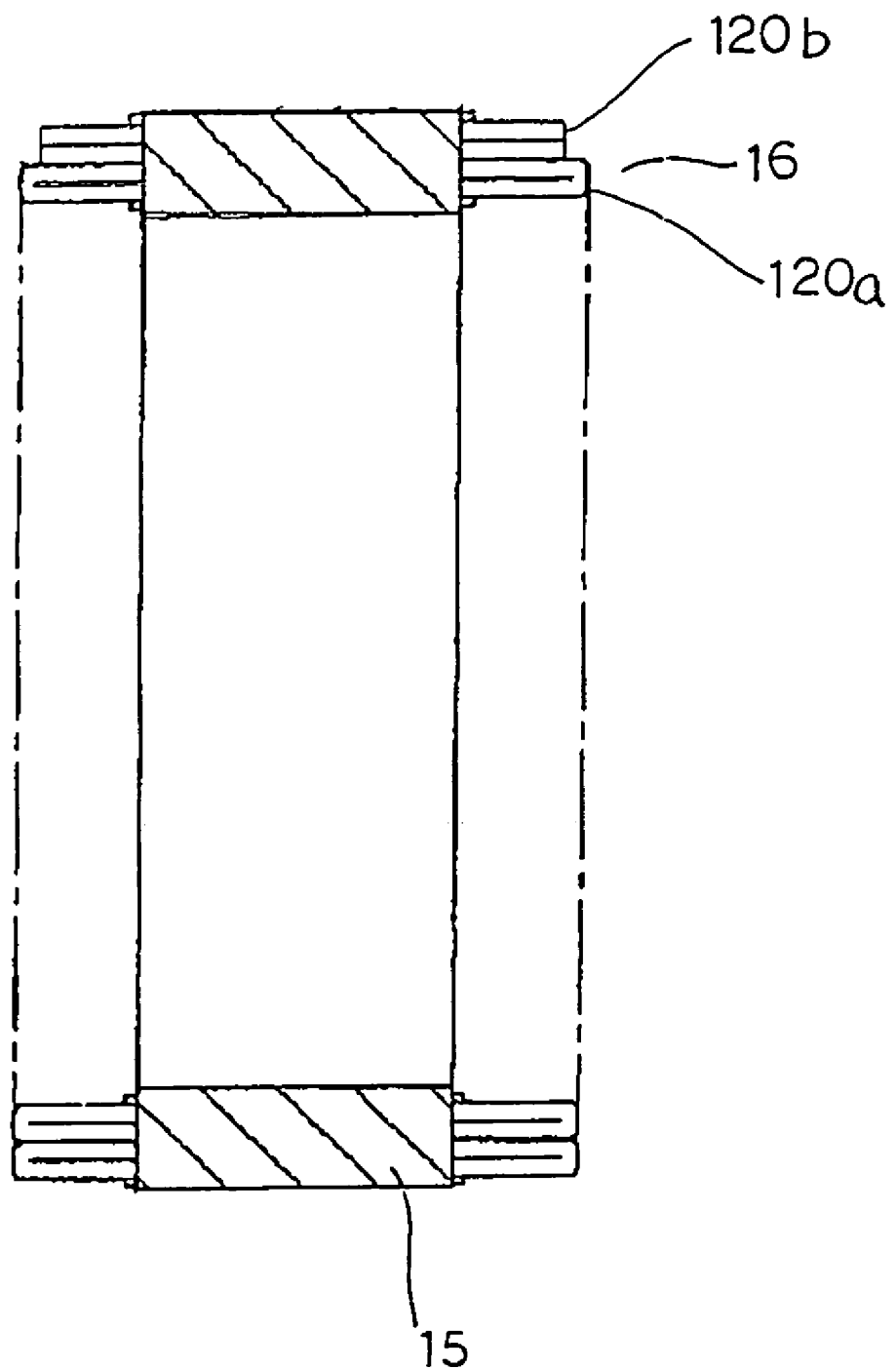
FIG. 11 is a cross section showing a stator of an automotive alternator according to Embodiment 3 of the present invention.

FIG. 11 is a partial cross section of an automotive alternator according to Embodiment 3 of the present invention.

In an automotive alternator according to Embodiment 3, wye coil end portions 120a being coil ends of wye-connected portions disposed on a radially-inner side of a stator winding 16 are axially longer than delta coil end portions 120b being coil ends of delta-connected portions disposed on a radially-outer side.

In this manner, the wye coil end portions 120a, which have higher electric current density, are placed nearer to centrifugal fans 5, colliding flow of cooling airflow is increased, and the wye-connected portions are cooled even more efficiently, preventing temperature distribution in the stator winding 16 from becoming nonuniform.

Moreover, in each of the above embodiments, the winding sub-portions are each constituted by a continuous wire, but winding sub-portions may also be configured by connecting together a plurality of conductor segments formed so as to have a general U shape made up of: a pair of straight portions housed inside slots; a linking portion linking the straight portions with each other; and joining portions disposed on leading end portions of the straight portions and projecting outward from an end surface of a stator core.

An automotive alternator has been explained as an example of a dynamoelectric machine, but of course the present invention can also be applied to any dynamoelectric machine such as an electric motor, a generator-motor, etc.

The invention claimed is:

1. A dynamoelectric machine comprising:
   a stator core having a plurality of slots extending axially; and
   a first three-phase wye-delta hybrid winding and a second three-phase wye-delta hybrid winding installed in said slots,
   said first three-phase wye-delta hybrid winding having:
      a first delta-connected portion in which a first delta U winding portion, a first delta V winding portion, and a first delta W winding portion are connected in a delta shape; and
      a second wye U winding portion, a second wye V winding portion, and a second wye W winding portion each connected to said first delta-connected portion in a Y (wye) shape,
   said second three-phase wye-delta hybrid winding having:
      a second delta-connected portion in which a second delta U winding portion, a second delta V winding portion, and a second delta W winding portion are connected in a delta shape; and
      a first wye U winding portion, a first wye V winding portion, and a first wye W winding portion each connected to said second delta-connected portion in a Y (wye) shape,
   said first delta U winding portion and said first wye U winding portion being housed in identical slots, said first delta V winding portion and said first wye V winding portion being housed in identical slots, said first delta W winding portion and said first wye W winding portion being housed in identical slots, and
   said second delta U winding portion and said second wye U winding portion being housed in identical slots, said second delta V winding portion and said second wye V winding portion being housed in identical slots, and said second delta W winding portion and said second wye W winding portion being housed in identical slots.

2. The dynamoelectric machine according to claim 1, wherein:
   said first three-phase wye-delta hybrid winding and said second three-phase wye-delta hybrid winding are installed in said slots of said stator core so as to have a phase difference corresponding to an electrical angle of approximately 30 degrees.

3. The dynamoelectric machine according to claim 2, wherein:
   each of said winding portions is constituted by a conductor in a full-pitch winding; and
   an equal number of conductors are housed in each of said slots.

4. The dynamoelectric machine according to claim 3, wherein:
   said first three-phase wye-delta hybrid winding and said second three-phase wye-delta hybrid winding are electrically connected separately to respective rectifiers.

5. The dynamoelectric machine according to claim 1, wherein:
   a ratio between turns of conductors in said first wye U winding portion, said first wye V winding portion, said first wye W winding portion, said second wye U winding portion, said second wye V winding portion, and said second wye W winding portion and turns of conductors in said first delta U winding portion, said first delta V winding portion, said first delta W winding portion, said second delta U winding portion, said second delta V winding portion, and said second delta W winding portion is 1:2.

6. The dynamoelectric machine according to claims 1, wherein:
   turns of conductors in said winding portions are even in number.

7. The dynamoelectric machine according to claim 1, wherein:
   a ratio between a cross-sectional area inside said slots of wye-connected conductors constituting said first wye U winding portion, said first wye V winding portion, said first wye W winding portion, said second wye U winding portion, said second wye V winding portion, and said second wye W winding portion and a cross-sectional area inside said slots of delta-connected conductors constituting said first delta U winding portion, said first delta V winding portion, said first delta W winding portion, said second delta U winding portion, said second delta V winding portion, and said second delta W winding portion is $\sqrt{3}$:1.

8. The dynamoelectric machine according to claim 7, wherein:
said wye-connected conductors have a substantially quadrilateral-shaped cross-sectional area in which a radial length is a long side and a circumferential length is a short side;
said delta-connected conductors have a substantially quadrilateral-shaped cross-sectional area; and
said wye-connected conductors and said delta-connected conductors are arranged in single columns radially inside said slots.

9. The dynamoelectric machine according to claim 1, wherein:
a fan for cooling said stator winding is mounted to an end surface of a rotor rotatably disposed inside said stator; and
wye-connected conductors constituting said first wye U winding portion, said first wye V winding portion, said first wye W winding portion, said second wye U winding portion, said second wye V winding portion, and said second wyc W winding portion are disposed radially further inward inside each of said slots than delta-connected conductors constituting said first delta U winding portion, said first delta V winding portion, said first delta W winding portion, said second delta U winding portion, said second delta V winding portion, and said second delta W winding portion.

10. The dynamoelectric machine according to claim 1, wherein:
wye-connected conductors constituting said first wye U winding portion, said first wye V winding portion, said first wye W winding portion, said second wye U winding portion, said second wye V winding portion, and said second wye W winding portion are disposed radially further outward inside each of said slots than delta-connected conductors constituting said first delta U winding portion, said first delta V winding portion, said first delta W winding portion, said second delta U winding portion, said second delta V winding portion, and said second delta W winding portion; and
said wye-connected conductors are housed inside said slots such that three sides of a rectangular cross section of wye-connected conductors disposed on a radially-outermost side are in close contact with inner wall surfaces with an insulator interposed.

11. The dynamoelectric machine according to claim 1, wherein:
end portions of said first wye U winding portion, said first wye V winding portion, said first wye W winding portion, said second wye U winding portion, said second wye V winding portion, and said second wye W winding portion project outward from a radially-innermost side inside said slots; and
said end portions are electrically connected to a rectifier disposed radially inside said stator by means of output wires.

12. The dynamoelectric machine according to claim 11, wherein:
said output wires have a circular cross sectional shape.

13. The dynamoelectric machine according to claim 1, wherein:
a wye end portion of said second wye U winding portion, said second wye V winding portion, and said second wye W winding portion connected to said first delta-connected portion in a Y (wye) shape projects outward from said stator core in a straight line axially and has a rectangular cross-sectional shape;
delta end portions of said first delta U winding portion, said first delta V winding portion, and said first delta W winding portion connected to said wye end portion have a rectangular cross-sectional shape; and
said wye end portion and said delta end portions are joined together with each other by surface contact.

14. The dynamoelectric machine according to claim 1, wherein:
a wye end portion of said second wye U winding portion, said second wye V winding portion, and said second wye W. winding portion connected to said first delta-connected portion in a Y (wye) shape projects outward from said stator core in a straight line axially and has a rectangular cross-sectional shape;
delta end portions of said first delta U winding portion, said first delta V winding portion, and said first delta W winding portion connected to said wye end portion have a circular cross-sectoinal shape; and
said wyc end portion and said delta end portions are joined together with each other.

15. The dynamoelectric machine according to claim 13, wherein:
said wye end portion and said delta end portions are surrounded by a ring made of a carbon steel sheet coated with tin; and
said wye end portion and said delta end portions are joined together by pressure from said ring.

16. The dynamoelectric machine according to claim 1, wherein:
a fan for cooling said stator winding is mounted to an end surface of a rotor rotatably disposed inside said stator;
a coil end of said stator winding projecting axially outward from an end surface of said stator core comprises:
a wyc coil end portion being a coil end portion of said first wye U winding portion, said first wye V winding portion, said first wye W winding portion, said second wye U winding portion, said second wye V winding portion, and said second wyc W winding portion; and
a delta coil end portion being a coil end portion of said first delta U winding portion, said first delta V winding portion, said first delta W winding portion, said second delta U winding portion, said second delta V winding portion, and said second delta W winding portion; and
an axial length of said wyc coil end portion is than an axial length of said delta coil end portion.

* * * * *